(12) United States Patent
Ku (10) Patent No.: US 10,442,404 B2
(45) Date of Patent: Oct. 15, 2019

(54) COUPLING MECHANISM FOR WIPER AND WIPER ARM

(71) Applicant: DONGGUAN HONGYI WIPER CO., LTD., Dong Guan, Guang Dong (CN)

(72) Inventor: Yuan-Chin Ku, New Taipei (TW)

(73) Assignee: DONGGUAN HONGYI WIPER CO., LTD., Dong Guan, Guang Dong (CN)

( * ) Notice: Subject to any disclaimer, the term of this patent is extended or adjusted under 35 U.S.C. 154(b) by 0 days.

(21) Appl. No.: 15/628,967

(22) Filed: Jun. 21, 2017

(65) Prior Publication Data

US 2017/0282864 A1    Oct. 5, 2017

Related U.S. Application Data

(62) Division of application No. 13/716,407, filed on Dec. 17, 2012, now Pat. No. 9,731,684.

(30) Foreign Application Priority Data

Sep. 12, 2012    (CN) .................... 2012 2 0464213 U (51) Int. Cl.
*B60S 1/38* (2006.01)
*B60S 1/40* (2006.01)

(52) U.S. Cl.
CPC ............... *B60S 1/40* (2013.01); *B60S 1/4048* (2013.01); *B60S 1/3856* (2013.01); *B60S 2001/4054* (2013.01)

(58) Field of Classification Search
CPC ......... B60S 1/3851; B60S 1/40; B60S 1/3849
See application file for complete search history.

(56) References Cited

FOREIGN PATENT DOCUMENTS

| WO | WO-2010028918 A1 * | 3/2010 | ............ B60S 1/3856 |
| WO | WO 2011116995 A1 * | 9/2011 | .............. B60S 1/387 |
| WO | WO-2011116995 A1 * | 9/2011 | .............. B60S 1/387 |

* cited by examiner

Primary Examiner — Michael D Jennings
(74) Attorney, Agent, or Firm — Li & Cai Intellectual Property (USA) Office (57) ABSTRACT

A coupling mechanism for interfacing between a wiper and a wiper arm comprises a connector and at least one width-adjusting spacer member. The connector has a body, and the two sides of the body are defined as the outer side walls. The body has a stopping portion formed at one end thereof, and an engaging member is formed on the top surface of the body. The width-adjusting spacer member is selectively arranged on the outer side walls of the body. Thus, the width of the coupling mechanism can be adjusted according to the user's demands, and thereby, enabling the wiper to be coupled to wiper arms having different specifications.

4 Claims, 13 Drawing Sheets

COUPLING MECHANISM FOR WIPER AND WIPER ARM

CROSS REFERENCE TO RELATED APPLICATIONS

This application is a divisional application of Ser. No. 13/716,407 filed on Dec. 17, 2012, and entitled "COUPLING MECHANISM FOR WIPER AND WIPER ARM", now being Noticed of Allowance, the entire disclosures of which are incorporated herein by reference.

BACKGROUND OF THE INSTANT DISCLOSURE

1. Field of the Instant Disclosure

The instant disclosure relates to a coupling mechanism; in particular, to a coupling mechanism for interfacing between a wiper and a wiper arm.

2. Description of Related Art

U.S. Pat. No. 7,690,074 discloses a coupling mechanism for interfacing between a wiper and a wiper arm that can often be found on commercial vehicles made by automakers such as Volkswagen (VW), in which a front opening of the wiper arm is slid along one end of the connector in a favorable direction for assembly thereto, where this movement will depress an engaging member of the connector during the assembly. When the wiper arm has slid to a predetermined position, the engaging hole of the wiper arm will be in alignment with the engaging member, and the pressure exerted on the depressed engaging member will be released for the engaging member to return to the original position. Hence, the engaging member will clip-in into the engaging hole for the connector to assemble to the wiper arm.

Nevertheless, wiper design has changed along with the rapid advancement of the wiper system. For example, the VW cars use only the standardized 19 mm wiper arm in the early days, but a structurally similar yet narrower wiper arm is later offered with a reduced width of 16 mm. This result in the earlier-sold wipers unable to be assembled to the now-sold 16 mm wiper arms because the accessories of the earlier-sold wipers can only support the 19 mm wiper arms but not the 16 mm wiper arms.

To address the above issues, the inventors strive via industrial experience and academic research to present the instant disclosure, which can effectively improve the limitations described above.

SUMMARY OF THE INSTANT DISCLOSURE

The object of the instant disclosure is to provide a coupling mechanism for interfacing between a wiper and a wiper arm, where the width of the coupling mechanism is adjustable. Therefore, wiper arms having different widths can be easily coupled to the accessories and the wipers.

In order to achieve the aforementioned objects, according to an embodiment of the instant disclosure, a coupling mechanism for interfacing between a wiper and a wiper arm is provided, comprising an connector having a body. The body has a pair of opposing outer side walls defined on the two sides thereof, a stopping portion formed on one end of the body, and an engaging member formed on a top surface of the body; at least one width-adjusting spacer member is selectively formed at the outer side walls of the body.

The instant disclosure further comprises a wiper arm, where the wiper arm is connected to the connector and the outer side of the width-adjusting spacer member. The engaging member of the connector is engaged to an engaging hole of the wiper arm. The width-adjusting spacer member will be partially or entirely received between the inner walls of the wiper arm and the outer side wall of the body.

The instant disclosure has the following advantages:

When the width-adjusting spacer member of the instant disclosure is arranged on the outer side wall of the body, the total width of the coupling mechanism will be increased; otherwise, when the width-adjusting spacer member is removed from the body, the total width of the coupling mechanism will be reduced. Hence, the width of the coupling mechanism is adjustable according to the user's demands, and thereby, enabling the wiper to be coupled to wiper arms having different specifications.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

The First Embodiment

Figure 1:
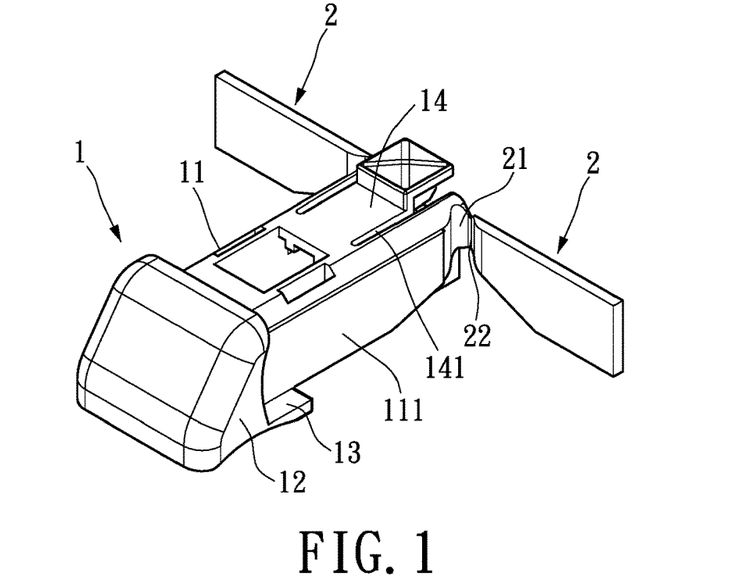
FIG. 1 shows a three-dimensional view of a coupling mechanism according to a first embodiment of the instant disclosure.
Figure 2:
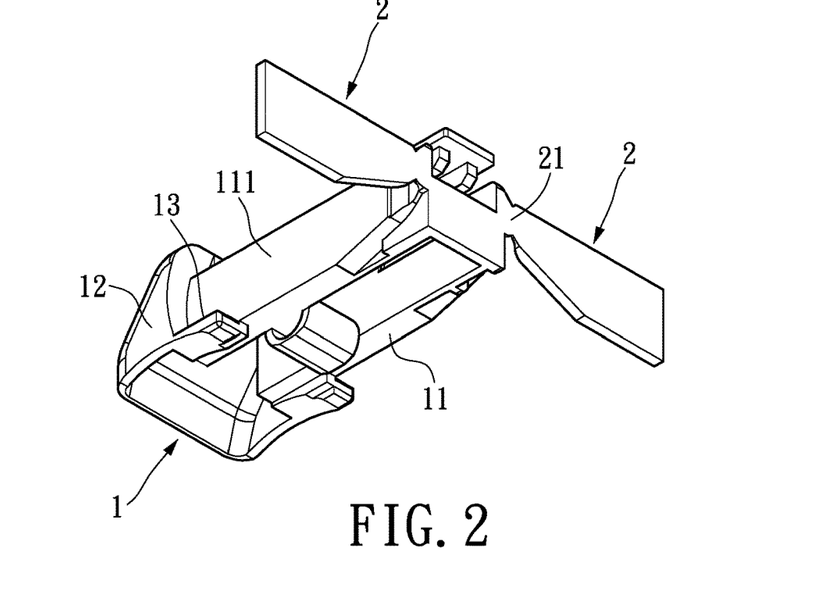
FIG. 2 shows a three-dimensional view of the coupling mechanism observing from a different angle; according to the first embodiment of the instant disclosure.
Figure 3:
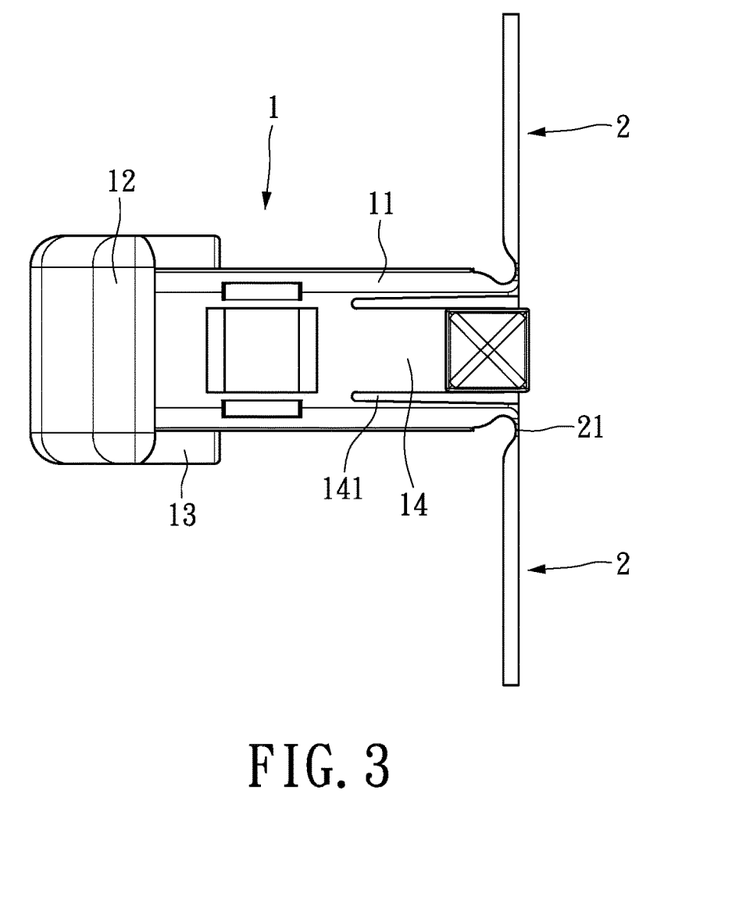
FIG. 3 shows a top view of the coupling mechanism according to the first embodiment of the instant disclosure.

Referring to FIGS. 1-3, a coupling mechanism for interfacing between a wiper and a wiper arm is provided in the instant disclosure, comprising an connector 1 and at least one width-adjusting spacer member 2, where the connector 1 includes a connecting mechanism (not shown) for connection to a wiper. Since the connective structure between the connector 1 and the wiper is known to those who are skilled in the instant field, therefore no further illustrations upon this shall be provided herein. For the instant disclosure, preferably, the connector 1 is made of plastic. Furthermore, the connector 1 has a body 11, where the two side walls of the body 11 are defined as the outer side walls 111.

The body 11 has a stopping portion 12 formed at one end thereof, where the width and height of the stopping portion 12 are larger than that of the body 11 to prevent the wiper arm 3 from sliding into the body 11 in lengthways.

The bottom surface of the body 11 has two protrusions 13 respectively formed thereon where the protrusions 13 protrude from the two sides of the body 11. For the instant embodiment, the protrusion 13 is further connected to the stopping portion 12 for the structure to be strengthened. Specifically speaking, the protrusions 13 can support the bottom surface of the wiper arm 3.

To provide further explanations, the body 11 has an engaging member 14 formed at the top surface thereof. The engaging member 14 is partially connected to the body 11 by forming two troughs 141 respectively at the two sides thereof. The engaging member 14 is an elastic arm which has flexibility to perform elastic movements. Preferably, the elastic engaging member 14 is formed at one end of the body 11, away from the stopping portion 12.

For the instant embodiment, the amount of the width-adjusting spacer member 2 can be one, two, or many, where this is not restricted thereto, and the width-adjusting spacer member 2 can be connected either directly or indirectly to the connector 1. For the instant embodiment, there are two width-adjusting spacer members 2 for example. The two width-adjusting spacer members 2 are connected respectively to the connector 1 by a pivotal portion 21 to form integrally as a single unit. Preferably, the width-adjusting spacer members 2 are connected to one end of the body 11, away from the stopping portion 21. For the instant embodiment, the width-adjusting spacer members 2 are connected directly to the body 11, where the width-adjusting spacer members 2 can be selectively arranged on the outer side walls 111 of the body 11.

A folded line 22 can be further formed between the width-adjusting spacer member 2 and the connector 1, where the folded line 22 is capable of separating the width-adjusting spacer member 2 from the connector 1 by tearing the folded line 22 when the width-adjusting spacer member 2 is no longer in use. Preferably, the folded line 22 is formed between the pivotal portion 21 and the width-adjusting spacer member 2.

The position of the width-adjusting spacer member 2 is adjustable by pivoting the width-adjusting spacer member 2 about the pivotal portion 21. The width-adjusting spacer members 2 will be arranged adjacently to the outer side wall 111 of the body 11 when the width-adjusting spacer member 2 pivots forwardly to a predetermined position for the total width of the coupling mechanism to increase. On the contrary, when the width-adjusting spacer members 2 pivot backwardly to a predetermined position, the total width of the coupling mechanism will be reduced. To provide further explanations, by separating the width-adjusting spacer members 2 from the connector 1 can also reduce the total width of the coupling mechanism.

Figure 4:
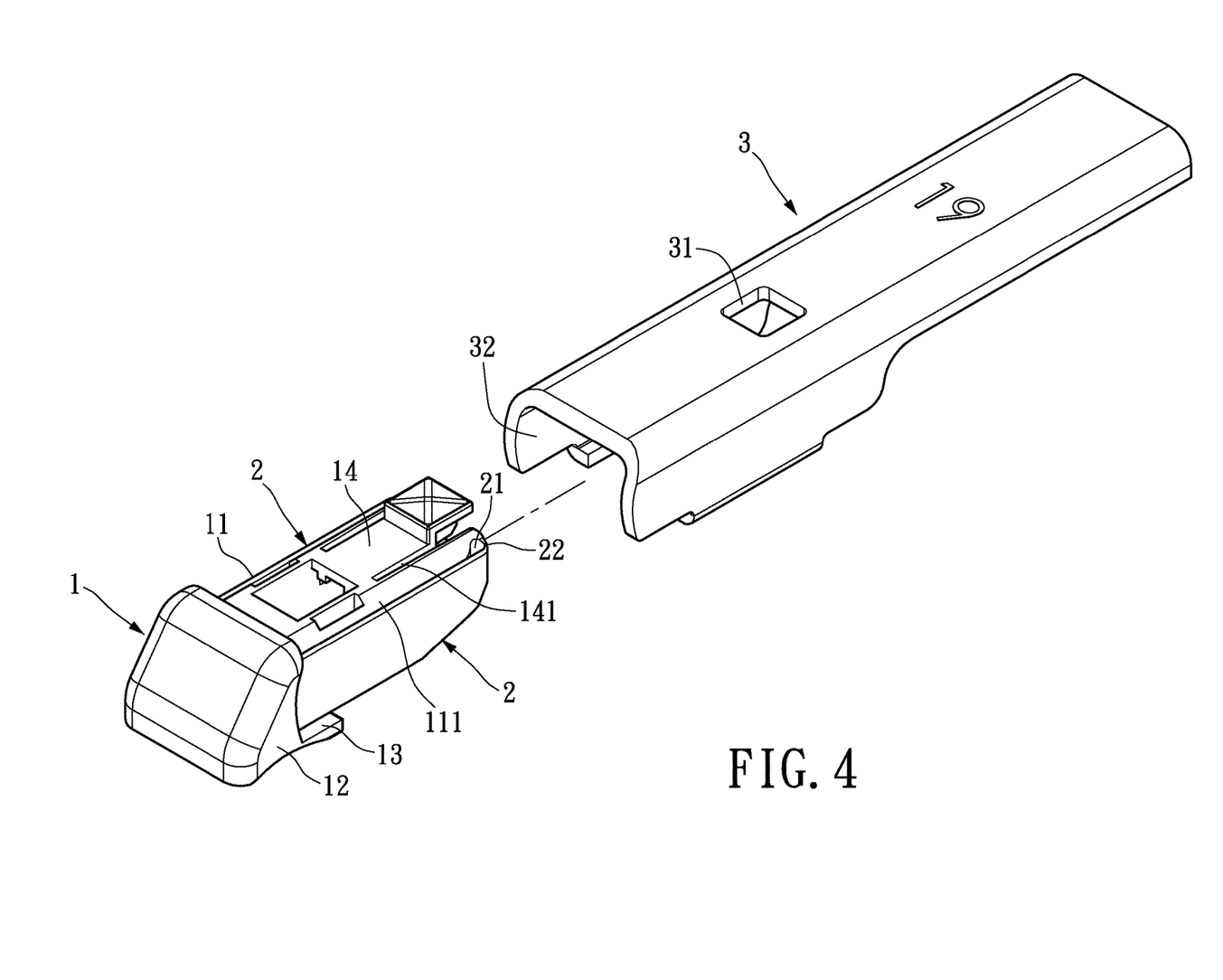
FIG. 4 shows an exploded view of the coupling mechanism under the first operational state according to the first embodiment of the instant disclosure.
Figure 5:
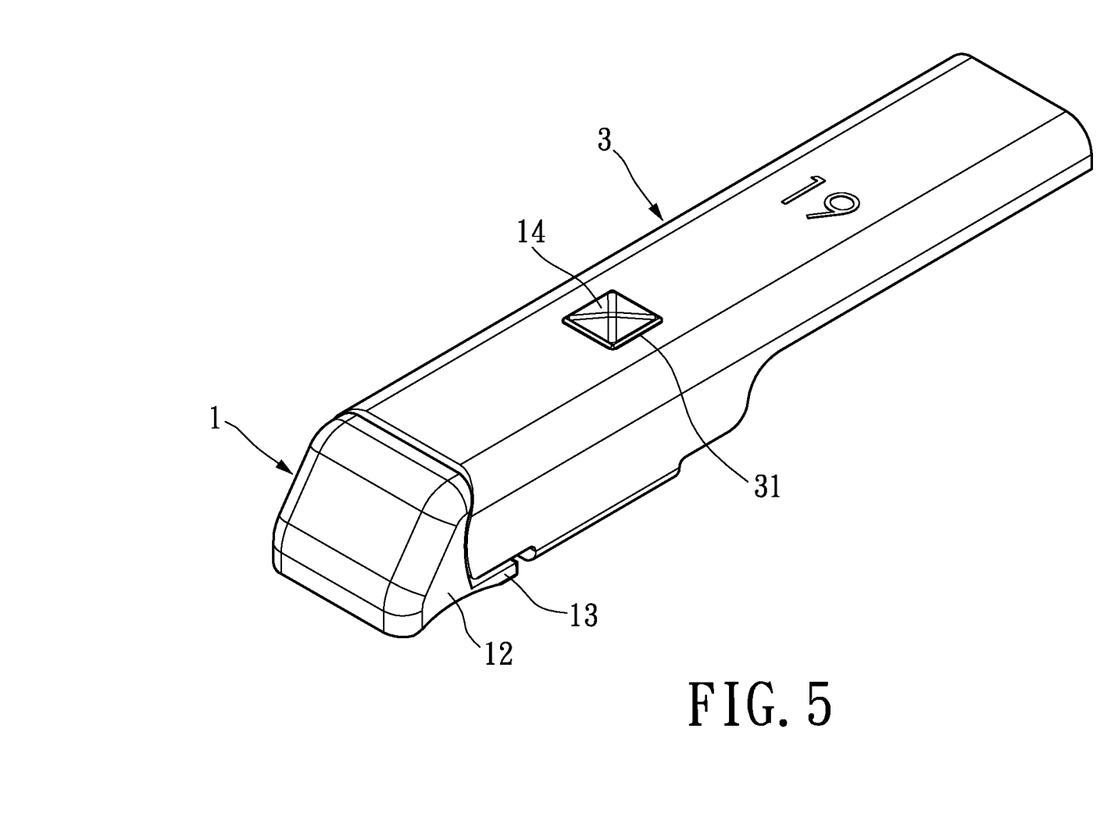
FIG. 5 shows an assembled view of the coupling mechanism under the first operational state according to the first embodiment of the instant disclosure.

Referring to FIGS. 4 to 5, when the 19 mm wiper arm 3 is applied in the instant embodiment, the width-adjusting spacer member 2 have to be pivoted forwardly to a predetermined position. Hence, the width-adjusting spacer members 2 will be arranged adjacently to the outer side wall 111 of the body 11 for the total width of the coupling mechanism to increase. During assembly, a front opening of the wiper arm 3 is slid along one end of the connector 1 in a favorable direction for assembly thereto, such that the wiper arm 3 is connected to the connector 1 and the outer side of the width-adjusting spacer member 2. Concurrently, the engaging member 14 of the connector 1 will be depressed. When the wiper arm 3 has slid to the predetermined position, the engaging member 14 will be in alignment with an engaging hole 31 of the wiper arm 3, where the pressure exerted on the depressed engaging member 14 will be released for the engaging member 14 to return to the original position. Hence, the engaging member 14 will clip-in into the engaging hole 31 for the connector 1 to assemble to the wiper arm 3. Furthermore, the wiper arm 3 has an inner wall 32. After the width-adjusting spacer member 2 is arranged adjacently to the body 11, the width-adjusting spacer member 2 will be received either partially or entirely within the inner wall 32 of the wiper arm and the outer side wall 31 of the body 11.

Figure 6:
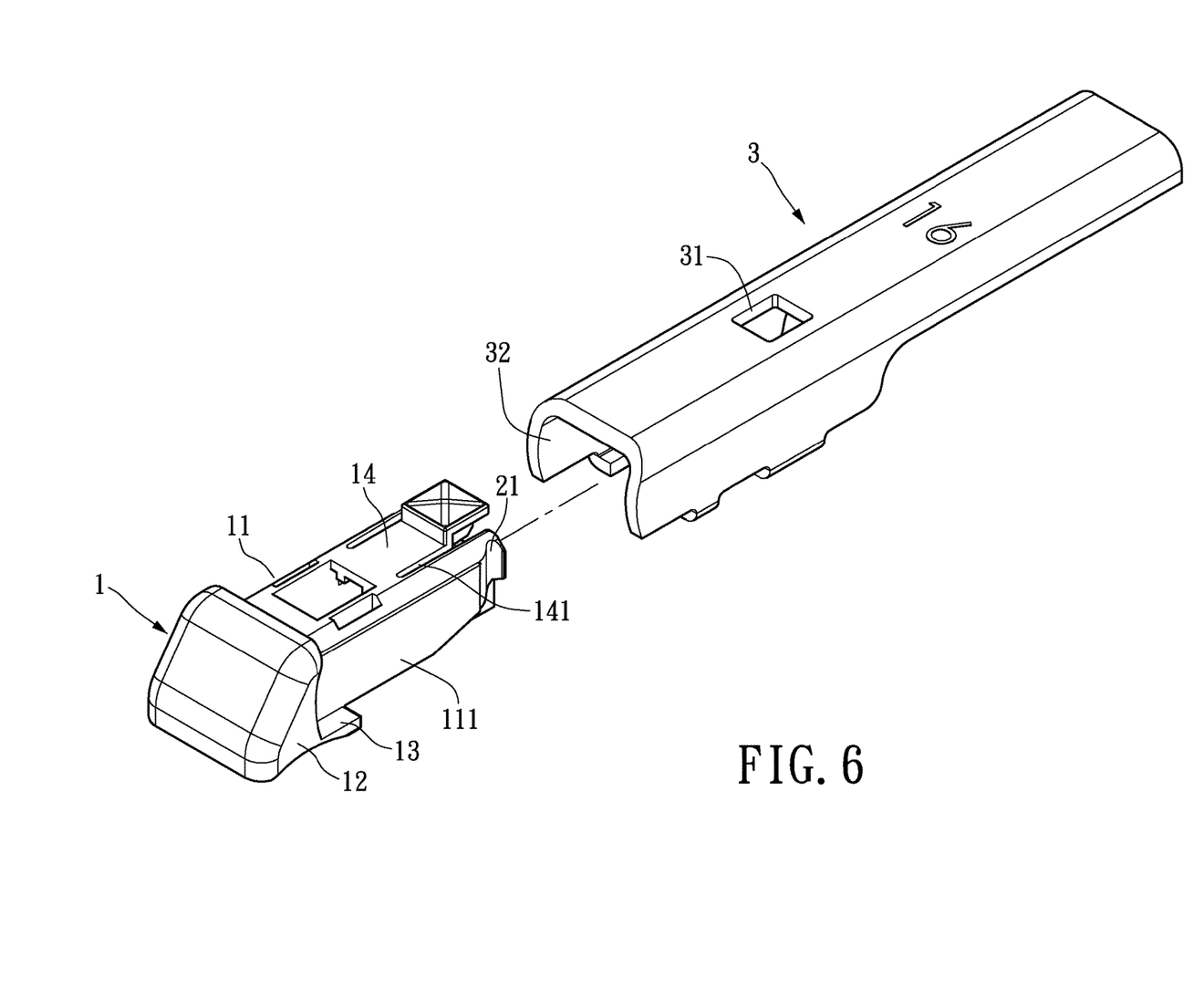
FIG. 6 shows an exploded view of the coupling mechanism under a second operational state according to a second embodiment of the instant disclosure.
Figure 7:
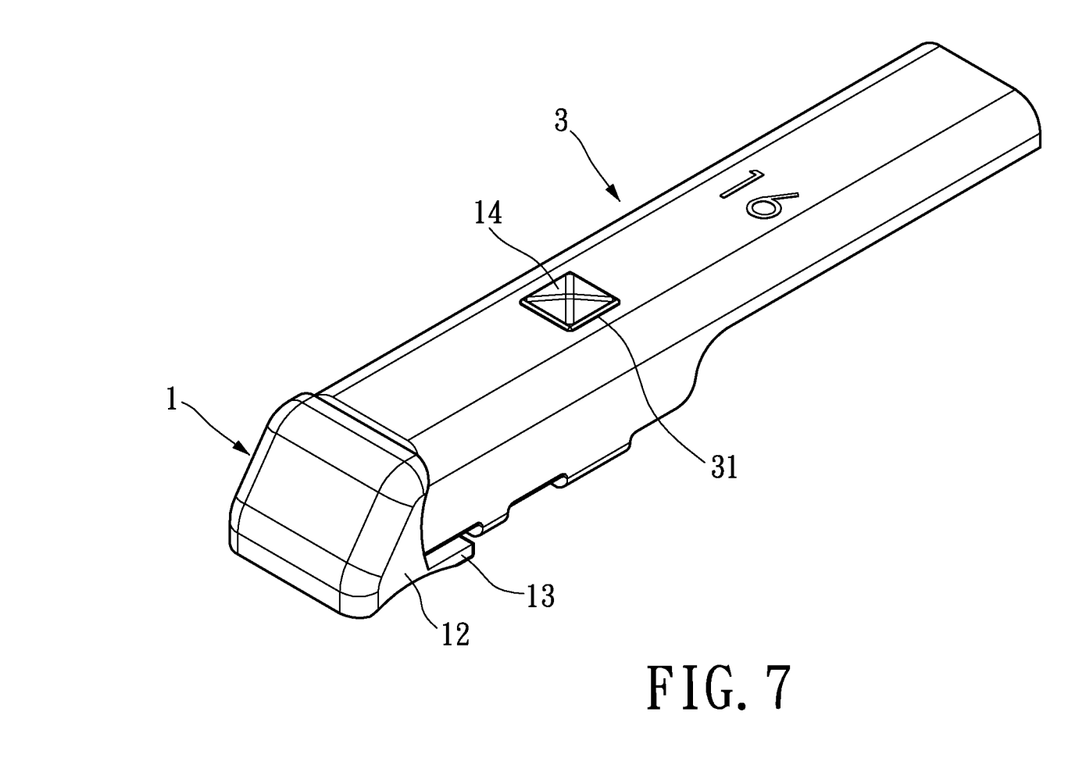
FIG. 7 shows an assembled view of the coupling mechanism under the second operational state according to the first embodiment of the instant disclosure.

Please refer to FIGS. 6 and 7. When the 16 mm wiper arm is applied in the instant embodiment, the total width of the coupling mechanism can be reduced by separating the width-adjusting spacer members 2 therefrom. During assembly, a front opening of the wiper arm 3 is slid along one end of the connector 1 in a favorable direction for the wiper arm 3 to connect to the outer side of the assembly. Meanwhile, the engaging member 14 of the connector 1 will be depressed. When the wiper arm 3 has slid to a predetermined position, the engaging member 14 will be in alignment with an engaging hole 31 of the wiper arm 3, where the pressure exerted on the depressed engaging member 14 will be released for the engaging member 14 to return to the original position. Hence, the engaging member 14 will clip-in into the engaging hole 31 for the connector 1 to assemble to the wiper arm 3.

Figure 13:
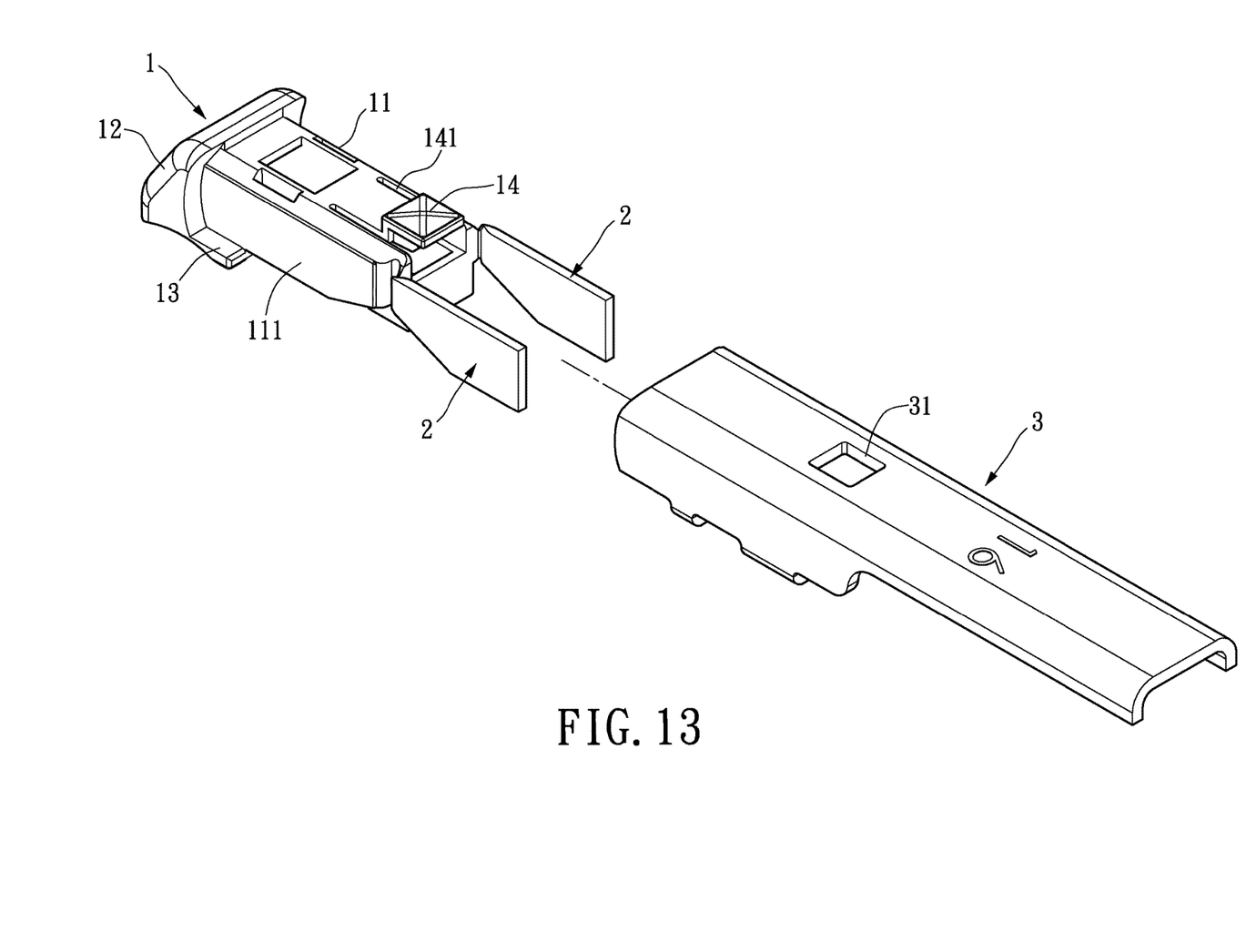
FIG. 13 shows an exploded view of the coupling mechanism under the third operational state according to the first embodiment of the instant disclosure.
Figure 14:
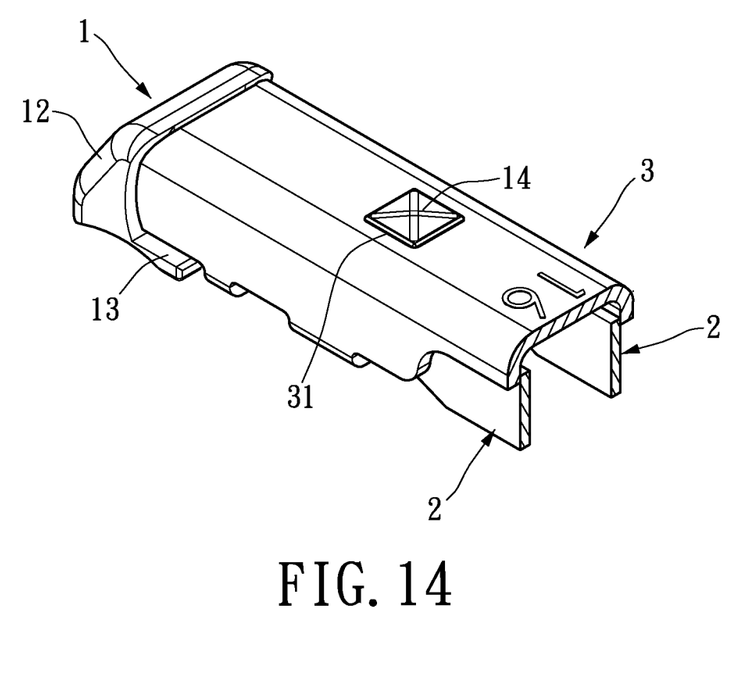
FIG. 14 shows a cross-sectional view of the coupling mechanism under the third operational state according to the first embodiment of the instant disclosure.

Referring to FIGS. 13 and 14, the total width of the coupling mechanism can also be reduced by pivoting the width-adjusting spacer member 2 backwardly to a predetermined position. During assembly, a front opening of the wiper arm 3 is slid along one end of the connector 1 in a favorable direction for assembly thereto, where this movement will depress the engaging member 14 of the connector 1. When the wiper arm 3 has slid to a predetermined position, the engaging hole 31 of the wiper arm 3 will be in alignment with the engaging member 14, where the pressure exerted on the depressed engaging member 14 will be released for the engaging member 14 to return to the original position. Hence, the engaging member 14 will clip-in into the engaging hole 31 for the connector 1 to assemble to the wiper arm 3, and where the width-adjusting spacer members 2 can be received in the wiper arm 3.

The Second Embodiment

Figure 8:
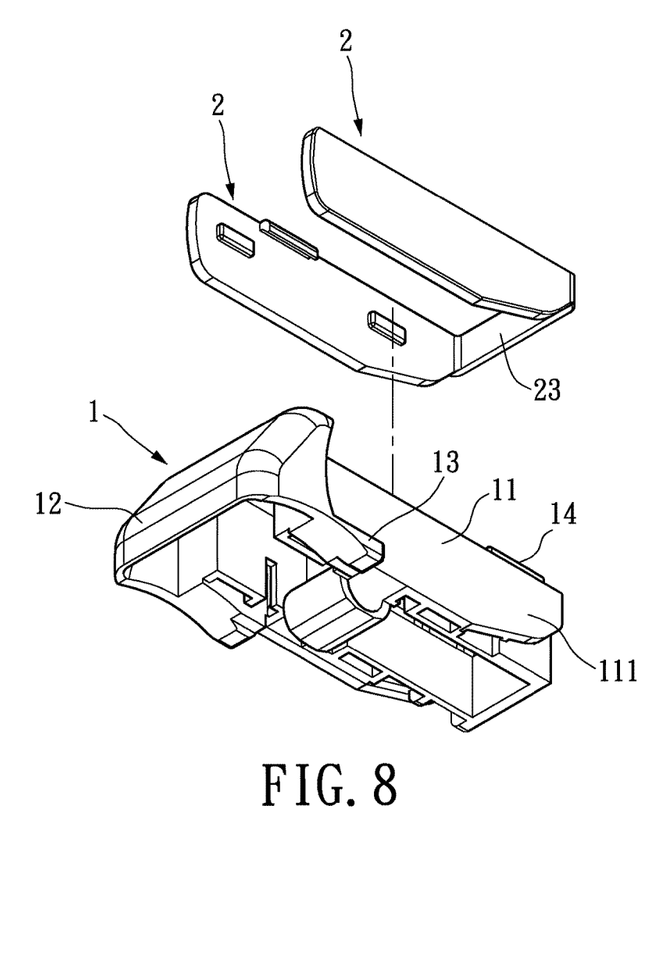
FIG. 8 shows a three-dimensional view of the coupling mechanism according to the second embodiment of the instant disclosure.

Referring to FIG. 8, according to another embodiment of the instant disclosure, the amount of the width-adjusting spacer member 2 is two for example. The two width-adjusting spacer members 2 are connected by a connecting portion 23, where the two width-adjusting spacer members 2 are connected indirectly to the connector 1. In other words, the two width-adjusting spacer members 2 and the connecting portion 23 cooperatively formed a substantially U-shaped structure, where the U-shaped structure can be arranged selectively on the outer side of the connector 1. To provide further explanations, when the width-adjusting spacer members 2 are arranged on the outer side of the connector 1, the total width of the coupling mechanism will be increased. Otherwise, when the width-adjusting spacer members 2 are removed from the connector 1, the total width of the coupling mechanism will be reduced.

Figure 9:
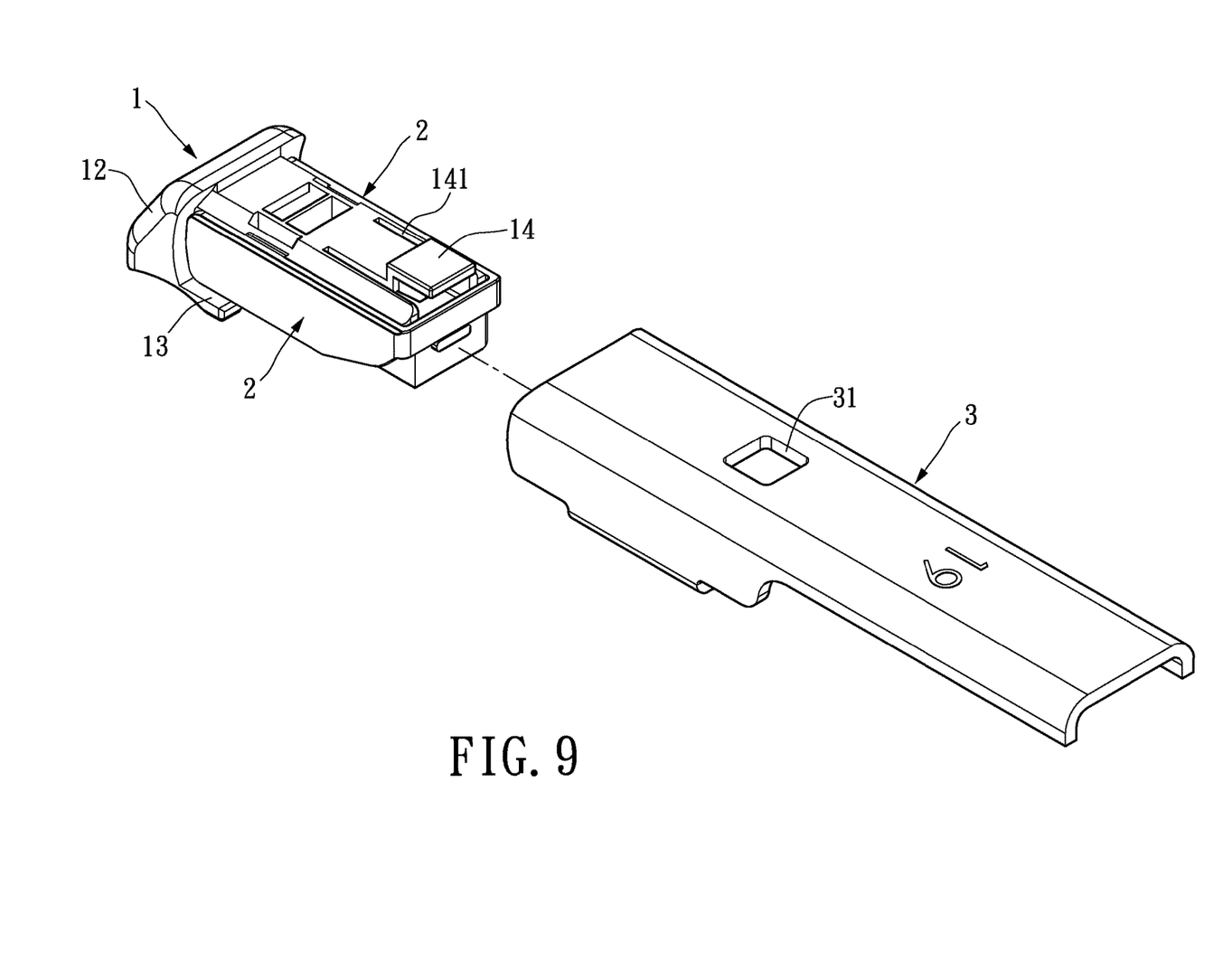
FIG. 9 shows an exploded view of the coupling mechanism under the first operational state according to the second embodiment of the instant disclosure.
Figure 10:
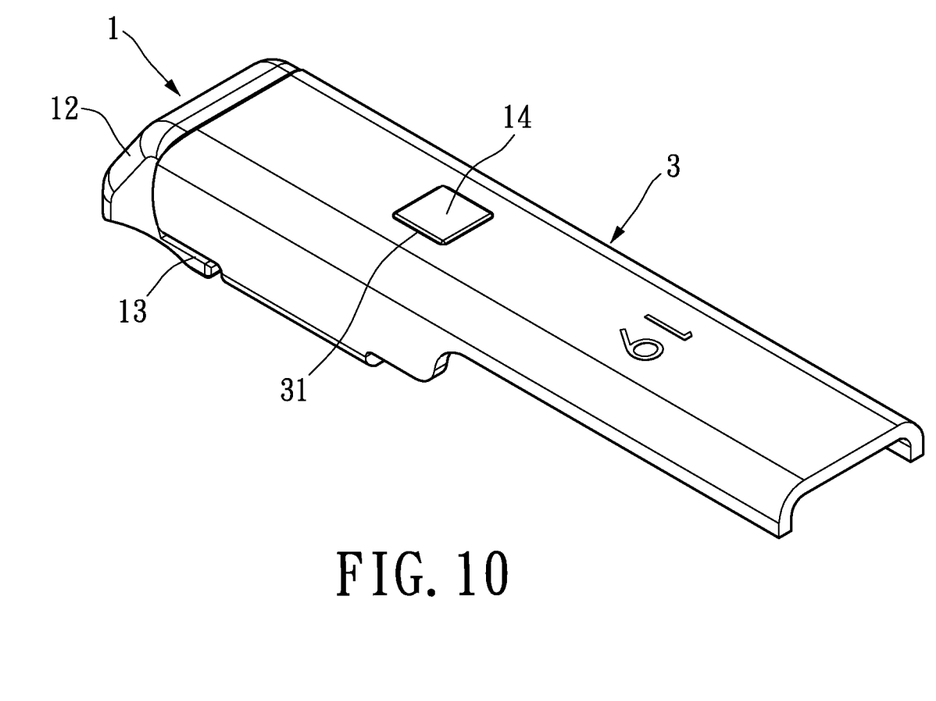
FIG. 10 shows an assembled view of the coupling mechanism under the first operational state according to the second embodiment of the instant disclosure.

Referring to FIGS. 9 and 10, when the 19 mm wiper arm 3 is applied in the instant embodiment, the two width-adjusting spacer members 2 will be arranged on the outer sides of the connector 1, such that the width-adjusting spacer members 2 are arranged adjacently to the outer side wall 111 of the body 11 for the total width of the coupling mechanism to increase. During assembly, a front opening of the wiper arm 3 is slid along one end of the connector 1 in a favorable direction for assembly thereto, where this movement will depress the engaging member 14 of the connector 1. When the wiper arm 3 has slid to a predetermined position, the engaging hole 31 of the wiper arm 3 will be in alignment with the engaging member 14, where the pressure exerted on the depressed engaging member 14 will be released for the engaging member 14 to return to the original position. Hence, the engaging member 14 will clip-in into the engaging hole 31 for the connector 1 to assemble to the wiper arm 3.

Figure 11:
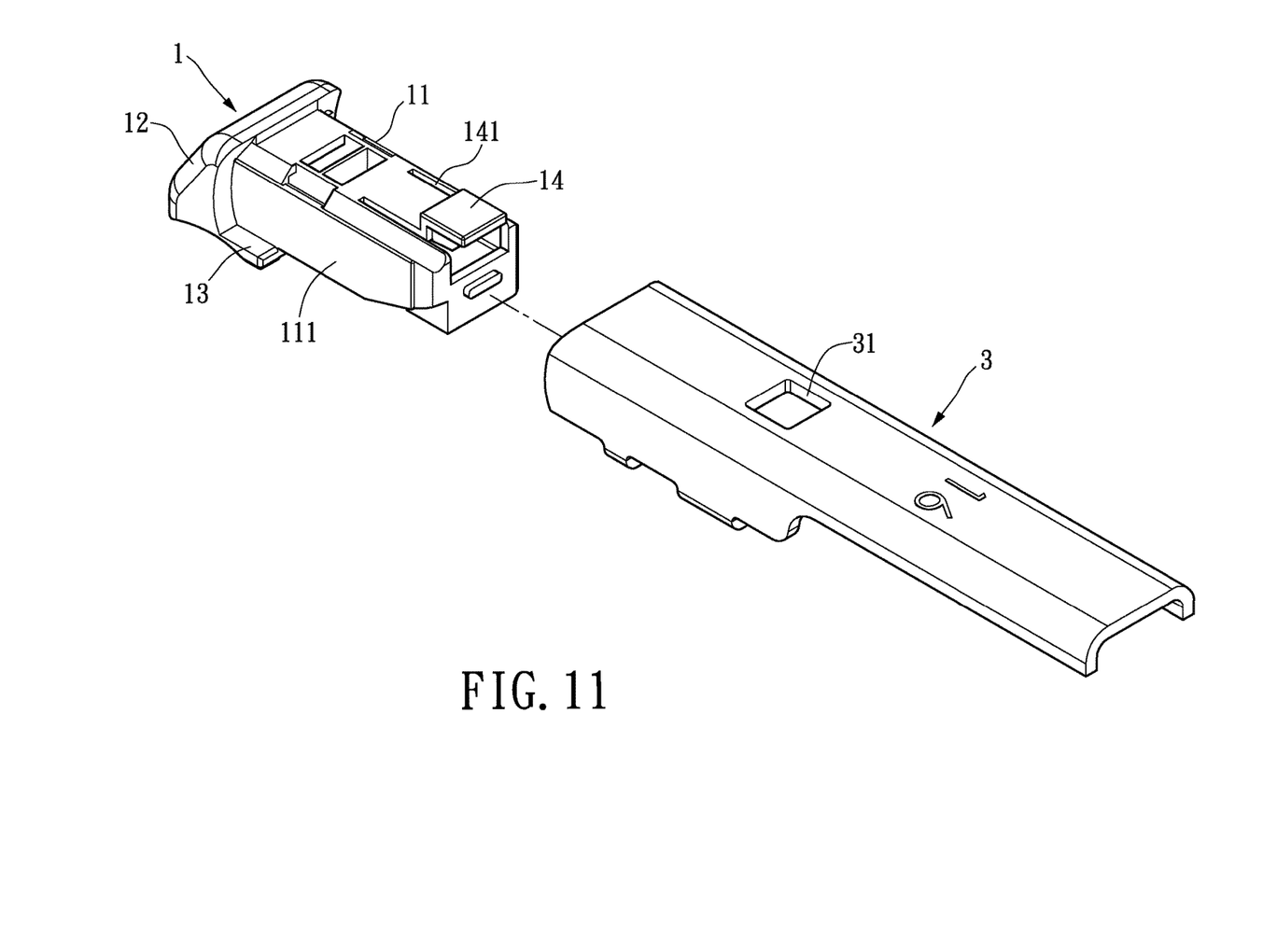
FIG. 11 shows an exploded view of the coupling mechanism under the second operational state according to the second embodiment of the instant disclosure.
Figure 12:
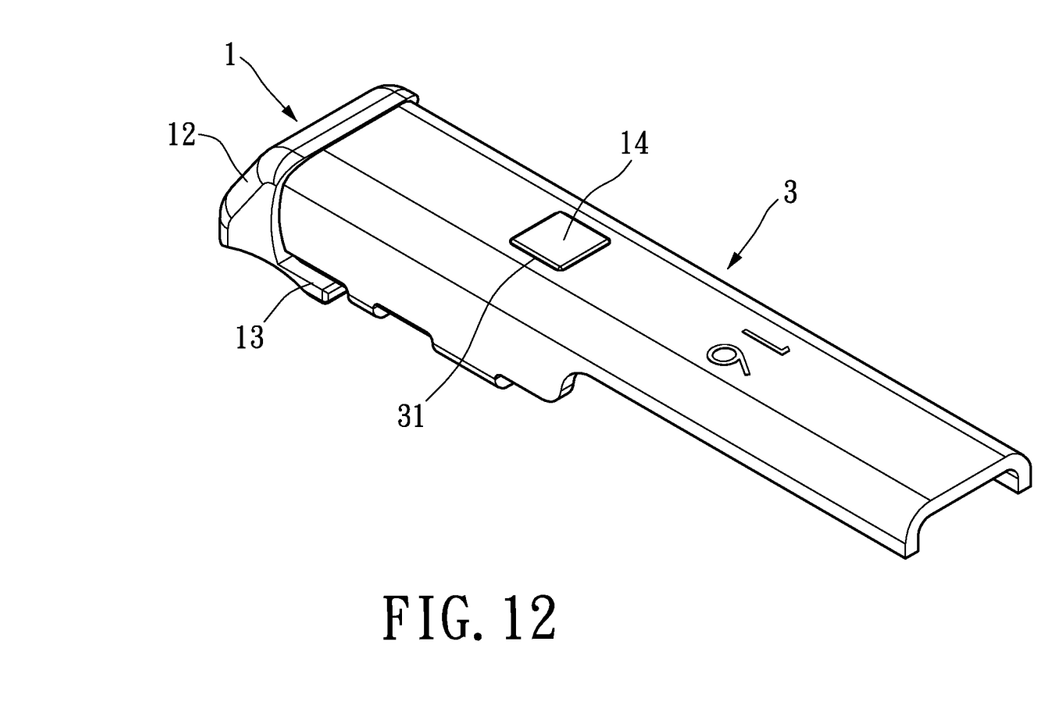
FIG. 12 shows an assembled view of the coupling mechanism under the second operational state according to the second embodiment of the instant disclosure.

Referring to FIGS. 11 and 12, when the 16 mm wiper arm 3 is applied in the instant embodiment, the two width-adjusting spacer members 2 can be dismantled for the total width of the coupling mechanism to reduce. During assembly, a front opening of the wiper arm 3 is slid along one end of the connector 1 in a favorable direction to assemble thereto, where this movement will depress the engaging member 14 of the connector 1. When the wiper arm 3 has slid to a predetermined position, the engaging hole 31 of the wiper arm 3 will be in alignment with the engaging member 14, where the pressure exerted on the depressed engaging member 14 will be released for the engaging member 14 to return to the original position. Hence, the engaging member 14 will clip-in into the engaging hole 31 for the connector 1 to assemble to the wiper arm 3.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A coupling mechanism for connecting between a wiper to wiper arms with different width specifications, comprising:

a connector including an body having two outer side walls, a stopping portion formed on one end of the body, and an engaging member formed on a top surface of the body; and two width-adjusting spacer members connected by a connecting portion, the two width-adjusting spacer members and the connecting portion cooperatively formed a substantially U-shaped structure, and the two width-adjusting spacer members selectively engaged with and adjacently arranged to the two outer side walls of the body, wherein the two width-adjusting spacer members and the connecting portion are detachable from the connector, wherein when connecting the coupling mechanism to a first wiper arm with a first width conforming to a first width specification, the two width-adjusting spacer members are respectively engaged with the two outer side walls of the body and abut against a first inner wall of the first wiper arm, a distance between outside surfaces, which are surfaces facing the first inner wall of the first wiper arm, of the two width-adjusting spacer members is equal to the first width conforming to the first width specification, and the outside surfaces of the two width-adjusting spacer members abut against the first inner wall of the first wiper arm;

wherein when connecting the coupling mechanism to a second wiper arm with a second width conforming to a second width specification, the two width-adjusting spacer members are respectively disengaged and detached from the two outer side walls of the body, the two outer side walls of the body abut against a second inner wall of the second wiper arm, and a distance between outside surfaces, which are surfaces facing the second inner wall of the second wiper arm, of the two outer side walls is equal to the second width conforming to the second width specification; and wherein the first width conforming to the first width specification is greater than the second width conforming to the second width specification.

2. The coupling mechanism for connecting between a wiper to wiper arms with different width specifications according to claim 1, wherein the body has two protrusions respectively formed on the two sides of the bottom surface thereof, wherein the protrusions are connected to the stopping portion.

3. The coupling mechanism for connecting between a wiper to wiper arms with different width specifications according to claim 1, wherein the engaging member is formed at one end of the body, away from the stopping portion.

4. The coupling mechanism for connecting between a wiper to wiper arms with different width specifications according to claim 1, wherein at least one of the width-adjusting spacer members has an inside engaging member, and an inside surface of the width-adjusting spacer member is selectively engaged with the outer side wall of the body.

* * * * *